United States Patent Office 3,751,331
Patented Aug. 7, 1973

3,751,331
ADHERING TEXTILES AND METALS TO RUBBER AND PRODUCT
Ivo Dane, Leverkusen, Guido Fromandi, Schildgen, Paul Blankenstein, Cologne-Riehl, Erwin Muller, Leverkusen, Helmut Freytag, Cologne-Stammheim, and Wolfgang Huther, Cologne-Mulheim, Germany, assignors to Bayer Aktiengesellschaft, Leverkusen, Germany
No Drawing. Original application Sept. 19, 1966, Ser. No. 580,205, now abandoned. Divided and this application May 25, 1970, Ser. No. 40,370
Claims priority, application Germany, Oct. 2, 1965, F 47,344
Int. Cl. B32b 5/02, 5/16, 15/06
U.S. Cl. 161—83                                13 Claims

ABSTRACT OF THE DISCLOSURE

Bonding of rubber to textiles or metals utilizing a vulcanizable rubber containing a formaldehyde donor, a formaldehyde acceptor and a finely dispersed silica filler.

CROSS-REFERENCE TO RELATED APPLICATION

This application is a division of application Ser. No. 580,205 as filed Sept. 19, 1966 and now abandoned.

Textiles are incorporated into numerous products of the rubbery industry, such as motor car tires, conveyor belts, driving belts, V-belts, hoses, shoes, etc., usually for the purpose of reinforcement. One important requirement in all these cases is that a good bond should be obtained between the rubber and textile, but this is not achieved without special measures being taken, especially when semi-synthetic or fully synthetic fibres are used.

In order to obtain sufficient bond strength with the rubber, the textiles usually have to be pre-impregnated. Such pre-treatments are nowadays generally carried out using natural and synthetic rubber latices with the addition of resorcinol formaldehyde resins dissolved or dispersed in water, which resins are normally not completely condensed and undergo further condensation by the addition of formaldehyde in the course of the subsequent working process. In many cases, however, the bond strength obtained by such impregnation is not sufficient.

In recent years, processes for further improvement of bond strength have become known in which certain compounds, of which a number will be mentioned hereinafter under the examples of compounds which give off formaldehyde, are added in combination with resorcinol or certain other resorcinol derivatives mentioned below to the textile which has either been pre-impregnated or not undergone preliminary treatment.

It has now been found that a very substantial increase in the bond strength between rubber and textiles can be achieved if in addition to compounds which are capable of splitting off formaldehyde on heating, in some cases in the presence of water, and in addition to m-disubstituted benzene derivatives which are substituted by amino groups or by hydroxyl groups which may be etherified or esterified or condensates thereof with dialkyl ketones or formaldehyde or alkyl or aryl aldehydes or 1,5-dihydroxynaphthalene (this latter instead of the benzene derivatives), finely dispersed silica fillers are also added to the vulcanisable rubber mixture which is to be applied to the textile and is subsequently vulcanized. Instead of the benzene derivatives mentioned above, one could also use precondensed but not yet completely condensed resorcinol formaldehyde resins. The improvement in bond strength occurs not only in textiles which have undergone pretreatment for improving the bond but also to a particularly marked extent in textiles that have not been pretreated. The bond strength that can be achieved by the addition of silica filler and the above-mentioned benzene derivatives is, of course, not equally high in the case of all products that split off formaldehyde, but in the case of some "splitters," the improvement in the bond strength is so great that in many cases the bond strengths obtained on textiles that have not been pretreated are of a value that has hitherto only been obtainable, in the prior art, by pretreatment of the textiles. The special pretreatment of textiles, which have hitherto been unavoidable, may therefore be unnecessary for many fields of application by reason of the process according to the invention.

By formaldehyde-splitting compounds are to be understood those compounds which are capable of splitting off formaldehyde when heated, e.g. to temperatures in the region of 40 to 200° C., in particular under vulcanisation conditions, optionally in the presence of water. When methylolethers or methylolesters are used, condensation reactions may also occur which split off alcohols or acids. Such products will hereinafter briefly be termed "formaldehyde splitters."

The following are examples of formaldehyde splitters:

trimetric methyleneamino-acetonitrile,
1-aza-3,7-dioxabicyclo-[3,3,0]-octane or oxazolidines,
bis-(1,3-oxazolidine)methane, octahydro-1,3-benzoxazole,
tetrahydro-1,3-oxazine, dialkylamino-methylalkyl-ether,
diallylamino-methyllalkylether (see e.g. Belgian patent specification 621,923), for example 4,4-dimethyl-1,3-oxazolidine,
bis-(4,4-dimethyl-1,3-oxazolidine)-methane,
N,n-butyl-5(6)-cyano-octahydro-1,3-benzoxazole,
3-n-butyl-tetrahydro-1,3-oxazine,
diisopropyl-aminomethyl-ethyl ether,
diallyl-aminomethylethyl-ether,
hexa(methoxymethyl)melamine,
N-methylol-carboxylic acid amides, such as, for example, N-methylolacetamide,
N-methylol-butyramide,
N-methylol-acrylamide,
N-methylol-methacrylamide,
N-methylol-succinimide and
N-methylolmaleic acid imide.

The following are examples of further formaldehyde splitters: 1,8-di-(methyleneamino)-p-methane or azomethine, for example $\alpha,\alpha$-dimethyl-benzylazomethine (see U.S. patent specification 2,512,128), or cyclotrimethylenetriamines such as N,N',N''-trimethyl-cyclotrimethylenetriamine or N,N',N'' - triethyl-cyclotrimethylenetriamine, diaminomethanes disubstituted on both N-atoms, e.g. bis[di(cyanomethyl)amino]-methane or bis(diallylamino)methane, imidazolidines substituted on both N-atoms, e.g. N,N'-diphenyl-imidazolidine or N,N'-dibenzylimidazolidine or hexahydropyrimidines substituted on both N-atoms, e.g. N,N'-di-n-hexyl-hexahydropyrimidine (see Belgian patent specification 624,519). Hexamethylenetetramine is an example of another heterocyclic compound.

Other formaldehyde splitters that can be used according to the invention are methylol melamines such as hexamethylol melamine some or all hydroxyl groups of which may be etherified or esterified. The hexamethylolmelamine used need not be present in pure form but may be used in the form of products which have a slightly lower formaldehyde content or which contain higher molecular weight condensation products. Hexamethylolmelamine may be prepared in known manner, e.g. by reacting about 1 mol of melamine with about 6 mols of aqueous formaldehyde solution (see "Helvetica chimica acta," 24, p.

315 E; Swiss Pat. 197,486; and Houben-Weyl "Methoden der organischen Chemie," vol. 8, p. 242).

As already mentioned above, instead of hexamethylol melamine one may use its esters or ethers, which may be regarded as masked methylol compounds. Compounds which are suitable in the present case as well as in the cases given below of the use of ethers or esters are in particular lower alkyl ethers such as, for example, methyl-, ethyl-, propyl-, butyl-, and allyl ethers, in which case 1 to 6 hydroxyl groups may be etherified Especially suitable esters are lower aliphatic carboxylic acid esters such as acetates and propionates. Examples of such compounds are hexamethylol melamine acetate and hexamethylol melamine propionate. Furthermore, one may, of course, also use, methylol melamines which contain at the most 5, and preferably 3 to 5, methylol groups per mol, which methylol groups may be all or partly etherified or esterified. The compounds are prepared by methods known per se by reacting melamine with the desired quantity of formaldehyde and, if desired, etherifying or esterifying the resulting methylol compounds (see Houben-Weyl "Methoden der organischen Chemie," vol. 8, p. 358). In general, this process does not lead to chemically uniform compounds but to mixtures of different types of methylol compounds which may also be used. The same applies to esters and ethers as has been said above of hexamethylolmelamine. Examples of such compounds are: pentamethylol melamine acetate and pentamethylol melamine propionate.

Tetramethylol-hydrazo-dicarboxylic acid amide the hydroxyl groups of which may also be either all or partly etherified or esterified may also be used. It is particularly advantageous to use the crystalline form of tetramethylol-hydrazo-dicarbonamide which is obtained by reacting hydrazo dicarbonamide with 4 mols of formaldehyde (see Houben-Weyl, "Methoden der organischen Chemie," vol. 14/2, p. 352). Instead of the pure compound (M.P. 149° C.), resinous condensation products containing more or less formaldehyde may also be used. Examples of esters and ethers are tetramethylol-hydrazo-dicarbonamide-acetate and -propionate.

In addition, the following compounds may be used as formaldehyde splitters: Tetramethylol-acetylene-diurea, the hydroxyl groups of which may also be all or partially etherified or esterified. Tetramethylol-acetylene-diurea need not be present in the pure form but may be used in the form of products which have a slightly lower formaldehyde content or which contain higher molecular weight condensation products. The preparation of tetramethylol-acetylene-diurea may be carried out in known manner, e.g. according to Houben-Weyl "Makromolekulare Chemie" 2, p. 353. The following are examples of esters and ethers: Tetramethylol-acetylene-diurea-tetramethyl ether and tetramethylol-acetylene-diurea-tetraacetate.

Formaldehyde splitting methylol compounds, in particular N-methylol compounds and their derivatives in which the hydroxyl groups may also be entirely or partly etherified or esterified, e.g.

N,N'-dimethylolurea,
dimethylol-urea-dimethylether,
N,N'-dimethylol-uronic-dimethyl ether,
methylene-bis-(methylol-urea-methyl ether),
dimethylol-urea-di-n-butyl ether.

N-substituted 1,3,5-dioxazines which may be substituted by straight or branched, saturated, or unsaturated alkyl, cycloalkyl, aryl or aralkyl radicals, which radicals may in turn be substituted and in which the substituent (on the nitrogen atom) may also contain further dioxazine rings. Examples of such compounds are: N-allyl-1,3,5-dioxazine; N-n-butyl-1,3,5-dioxazine; N-isobutyl-1,3,5-dioxazine; N-cyclohexyl-1,3,5-dioxazine; N-phenyl-1,3,5-dioxazine; N-(β-hydroxyethyl)-1,3,5-dioxazine; N - ethyl-acetate-1,3,5-dioxazine; or N,N'-ethylene-bis-(1,3,5-dioxazine).

The dioxazines may, for example, be prepared in known manner by reacting the corresponding amines with an excess of formaldehyde. Instead of the pure compounds, one may also use the mixtures obtained by such a preparation with condensation products which contain a varying quantity of formaldehyde. Paraformaldehyde may also be used.

Particularly high bond strengths have been obtained with rubber mixtures treated with the silica fillers according to the invention in cases where the following compounds were added in combination with resorcinol:

hexamethylol melamine;
hexamethylol melamine-pentamenthylether;
a mixture of hexamethylol melamine tetramethylether and -trimethylether;
pentamethylol melamine-trimethylether;
tetramethylol hydrazo-dicarbonamide;
tetramethylol-acetylene -diurea;
N,N'-dimethylol-urea;
N-methylol-dicyandiamide;
methylene-amino-acetonitrile;
N-allyl-dioxazine,
N-phenyl-dioxazine and
1-aza-3,7-dioxa-bis-cyclo-[3,3,0]-octane.

As already mentioned above, the formaldehyde splitters are used together with resorcinol or other benzene derivatives which are preferably substituted in the m-position by amino groups or by hydroxyl groups which may be etherified or esterified or its condensates with dialkyl ketones or formaldehyde or alkyl- or aryl aldehydes or 1,5-dihydroxy-naphthalene. Examples of such derivatives are as follows: m-Aminophenol; m-phenylendiamine; resorcinol diacetate or propionate or butyrate, resorcinol monomethyl ether or resorcinol propyl ether.

Resorcinol formaldehyde resins which have been precondensed but not completely condensed may also be used as additives to the mixture.

When the resorcinol which is particularly effective is used, it has been found advantageous in the working up process to use a type of formaldehyde splitter in which resorcinol is soluble since solutions of resorcinol in formaldehyde splitters can be added after the rubber mixtures have cooled to below 100° C., if desired together with sulphur or the vulcanisation accelerators. The temperature conventionally used for incorporating resorcinol at which dense clouds of noxious vapour are emitted which can cause great discomfort to the operators is thus avoided. The nuisance caused by the resorcinol vapours can also be avoided in a similar manner by dissolving resorcinol in suitable plasticizers and then adding it as described above at the end of the mixing process.

For the exceptional increase in bond strength obtained according to the invention the use of finely dispersed reinforcing silica fillers in the rubber mixture is of essential importance. By finely dispersed reinforcing silica fillers is to be understood substances having a silica content of more than 80% by weight based on dry filler and a specific surface, determined by nitrogen absorption according to BET (S. Brunauer, P. H. Emmet, E. Teller, Journal of the American Chemical Society 60, 309 [1938], of about 70 to 400 m.$^2$/g., preferably 80 to about 200 m.$^2$/g. corresponding to an average primary particle size of about 0.007 to 0.04μ, preferably an average primary particle size of about 0.013 to about 0.035μ. Such silica fillers may be prepared e.g. by precipitation from silicate solutions or by hydrolysis of silicon halides in the gaseous phase or by volatilisation via silicon monoxide as intermediate stage, at high temperatures. It is preferred to use silica fillers which have been prepared by precipitation for the process according to the invention. The silica fillers may contain silicates such as calcium and/or aluminium silicates.

It has been found that an increase in the stearic acid content above the usual level, i.e. stearic acid contents of 1 to 5% by weight, preferably 2 to 3% by weight based on the rubber, in many cases still further increases the bond strength in the rubber mixtures according to the invention.

A really firm bonding effect is achieved in the rubber mixture to be applied to textiles if the amount of active silica filler added is at least 15% by weight. If the amount of additive is smaller, the bond strength decreases; where larger amounts of additive are used, the bond strength can be increased still further by a considerable amount. Above 70 to 100% by weight, increase in bond strength is generally only slight (percentages based on rubber). The formaldehyde yielding compounds are advantageously added in amount of between 0.2 and 10% by weight, preferably between 0.5 and 5% by weight. The improvement in bond strength is considerably enhanced by adding quantities of resorcinol or other N-substituted benzene derivatives which are approximately equal to the amount of the formaldehyde splitter, preferably between 0.2 to 2 times the quantity. During the operation of mixing resorcinol into the mixture, the temperature should lie above the melting point of resorcinol (about approximately 115° C.). Where the other benzene derivatives mentioned above are used, it is also advantageous if they are added when the temperature of the rubber mixture is above their melting point.

The types of rubber that may be used include both natural and synthetic rubber such as copolymers of butadiene - styrene, butadiene-acrylonitrile, isobutylene-isoprene, ethylene-propylene (usually with a third component such as dicyclopentadiene or 1,4-hexadiene), and in addition, polyisoprene, polybutadiene, polychlorobutadiene etc. as well as mixtures thereof.

Suitable textile materials are threads (in particular cords), as well as woven and knitted fabrics from all types of fibres such as rayon, polyamide, polyester, polyacrylonitrile, cotton, glass and other fibres. Thick wires of polyamide or polyester as well as cord threads from raw steel and zinc- or brass-coated steel may also be used. If bond improving pre-impregnation of the textiles is desired, this can be effected by use of the usual impregnating baths used in the art which contain, for example, latices based on natural rubber or copolymers of butadiene-styrene, butadiene-acrylonitrile, chlorobutadiene or butadiene-styrene-vinylpyridine or mixtures thereof and, preferably, resorcinol formaldehyde resins.

The rubber mixtures according to the invention are applied to the textiles by processes usual in the rubber industry. The rubber mixtures are preferably put into the process in solid form but one may also use solutions of the mixtures in organic solvents. e.g. by painting, impregnating or spraying them as adhesifying intermediate layer to the fabric. In contrast to other processes of this type used in the art, e.g. in the case of solutions of rubber mixtures with isocyanate additives, the solutions of the mixtures according to the invention afford the technically important advantage of being storable for prolonged periods. After the bond-imparting pretreatment, subsequent coating of the textiles with mixtures free from additives can be carried out by painting or backing.

The three components of the mixture according to the invention, resorcinol, formaldehyde splitters and silica reinforcing fillers, need not all be present in the rubber mixture from the start. It is also possible first to apply one or two of the said components, e.g. resorcinol or resorcinol and/or formaldehyde splitters in the form of a solution into the textile and then add only the remaining component(s) to the rubber mixture so that the required 3 components only come together during vulcanisation. One may use organic solvents alone but also a concentrated solution in an organic solvent may be emulsified in water with the use of a suitable emulsifier so that the operation of applying the additive to the textile takes place largely in an aqueous medium, which is commercially preferable. This process also makes it possible to avoid the formation of heavy smoke clouds of resorcinol at high temperatures.

It has been found that the combination according to the invention of formaldehyde splitters, resorcinol or the said resorcinol derivatives or precondensed resorcinol-formaldehyde resins and finely dispersed silica fillers also gives a substantial improvement in the adhesion of textiles to latices of the said types of rubber. In that case, the two first mentioned components are introduced into the latex mixture as solutions or aqueous dispersions. The finely dispersed silica is added in the form of aqueous silica sols in which the primary particles of silica are within the range mentioned for the primary particles of the fillers.

Vulcanisation of the finished article may be carried out in the customary manner. Provided the mixture is of the appropriate composition, it is however also possible to use very brief heating times at very high temperatures, e.g. about 1 to 2 minutes at 180° C. or about 0.5 to 1 minute at 200° C.

The following silica fillers are used in the examples given below:

SILICA FILLER 1

Commercial silica prepared by precipitation from silicate solution, having a specific surface area of 180 m.$^2$/g. (e.g. trade product "Vulkasil S" of Farbenfabriken Bayer AG., Leverkusen).

SILICA FILLER 2

Commercial silica containing calcium silicate and prepared by precipitation from silicate solution and having a specific surface area of 80 m.$^2$/g. (e.g. trade product "Vulkasil C" of Farbenfabriken Bayer AG., Leverkusen).

SILICA FILLER 3

Commercial silica obtained by hydrolysis in the gaseous phase, having a specific surface of 200 m.$^2$/g.

Example 1

The following rubber mixtures were prepared on mixing mills:

| Mixture | Parts by weight | | | |
|---|---|---|---|---|
| | 1a | 1b | 1c | 1d |
| Natural rubber | 50.0 | 50.0 | 50.0 | 50.0 |
| Styrene butadiene rubber | 50.0 | 50.0 | 50.0 | 50.0 |
| HAF black | 20.0 | 20.0 | 20.0 | 20.0 |
| MT black | 45.0 | 45.0 | 10.0 | 10.0 |
| Silica filler 1 | | | 30.0 | 30.0 |
| Resorcinol | | 2.5 | | 2.5 |
| Zinc oxide | 5.0 | 5.0 | 5.0 | 5.0 |
| Stearic acid | 1.0 | 1.0 | 1.0 | 1.0 |
| Factice | 10.0 | 10.0 | 10.0 | 10.0 |
| Aromatic mineral oil | 3.0 | 3.0 | 3.0 | 3.0 |
| Styrenated diphenylamine | 1.5 | 1.5 | 1.5 | 1.5 |
| Benzthiazyl-2-cyclohexylsulphenamide | 1.8 | 1.8 | 1.8 | 1.8 |
| Condensation product of acrolein with aromatic bases | 1.0 | 1.0 | 1.0 | 1.0 |
| Sulphur | 2.0 | 2.0 | 2.0 | 2.0 |
| Hexamethylolmelamine-pentamethyl ether | | 2.5 | | 2.5 |

In the case of mixtures 1b and 1d, preliminary mixtures of rubber, carbon black, silica filler and resorcinol were first prepared at a mixing temperature of 130° C. When these preliminary mixtures had cooled down to about 100° C., the remaining components of the mixture and lastly hexamethylolmelamine-pentamethylether were added. Mixtures 1a and 1c were prepared in the same way but without the addition of hexamethylolmelamine pentamethyl ether.

Sheets of about 1 mm. thickness made from these mixtures were placed each between two sections of non-pretreated cross-woven fabrics: cotton (105 warp threads Nm 20/2 per 10 cm., 105 weft threads Nm. 20/2 per 10 cm., weight per square metre 240 g.); rayon (240 warp threads TD 450/1 per 10 cm., 110 weft threads TD 900/1 per 10 cm., weight per square metre 320 g.); nylon (250 warp threads TD 810/1 per 10 cm., 120 weft threads TD 810 per 10 cm., weight per square metre 440 g.); and polyester (170 weft threads TD 900/1 per 10 cm., 130 warp threads TD 1000/1 per 10 cm., weight per square metre 370 g.). These sheets were then vulcanised in a press under a pressure of 20 kg./cm.$^2$. 2.5 cm. wide strips were stamped out of the plates produced in this way. The force required for separating one of the strips of fabric from rubber was treated on a stress-strain testing machine in which the force was indicated without inertia, at room temperature. The test results were evaluated with the aid of the stress-strain diagram, the means value being determined from the 10 highest value of a diagram in each case. Each of the test figures given below was obtained from 5 test strips. The following results were determined:

| Mixture | Bond strength in kg. per 2.5 cm. | | | |
|---|---|---|---|---|
| | 1a | 1b | 1c | 1d |
| Fabric: | | | | |
| Cotton fabric | 2.7 | 4.6 | 3.8 | 8.6 |
| Rayon fabric | 1.5 | 2.5 | 3.2 | 15.8 |
| Nylon fabric | 1.1 | 3.3 | 2.4 | 17.5 |
| Polyester fabric | 1.0 | 2.3 | 2.4 | 5.6 |

Example 2

Tests analogous to those in Example 1 were carried out with the same untreated fabrics but with modified mixtures 2a to 2e. The part of the mixtures which remains the same is termed hereinafter the basic mixture I. It has the following composition:

BASIC MIXTURE I

| | Parts by weight |
|---|---|
| Natural rubber | 50.0 |
| Styrene-butadiene rubber | 50.0 |
| HAF black | 20.0 |
| MT black | 10.0 |
| Zinc oxide | 5.0 |
| Stearic acid | 1.0 |
| Factice | 10.0 |
| Aromatic mineral oil | 3.0 |
| Styrenated diphenylamine | 1.5 |
| Benzthiazyl-2-cyclohexyl-sulphenamide | 1.8 |
| Condensation product of acrolein and aromatic bases | 1.0 |
| Sulphur | 2.0 |

The other substances added to basic mixture I are summarised below:

| Mixture | Additions to basis mixture I in parts by wt. | | | | |
|---|---|---|---|---|---|
| | 2a | 2b | 2c | 2d | 2e |
| Nature of additives: | | | | | |
| MT black | 35.0 | 10.0 | 10.0 | 10.0 | 10.0 |
| Silica filler 2 | | 40.0 | 40.0 | | |
| Silica filler 3 | | | | 30.0 | 30.0 |
| Resorcinol | | | 2.5 | | 2.5 |
| Hemamethylolmelamine | | | 2.0 | | |
| Hemamethylolmelamine-pentamethyl ether | | | | | 2.5 |

The following results were obtained in bond strength tests corresponding to Example 1:

| Mixture | Bond strengths in kg. per 2.5 cm. | | | | |
|---|---|---|---|---|---|
| | 2a | 2b | 2c | 2d | 2e |
| Fabric: | | | | | |
| Cotton fabric | 2.7 | 3.5 | 11.3 | 2.6 | 6.1 |
| Rayon fabric | 1.5 | 1.5 | 13.4 | 0.5 | 15.2 |
| Nylon fabric | 1.1 | 1.2 | 26.7 | 2.5 | 14.4 |
| Polyester fabric | 1.0 | 1.2 | 9.0 | 0.4 | 4.8 |

Example 3

In a manner analogous to Example 2, bond strength tests were made with use of the same untreated fabrics and the mixtures 3a to 3c indicated below, the substances added to the basic mixture I defined in Example 2 being again listed.

| Mixture | Additives to basic mixture I in parts by weight | | |
|---|---|---|---|
| | 3a | 3b | 3c |
| Nature of additives: | | | |
| MT black | 35.0 | 35.0 | 10.0 |
| Silica filler 1 | | | 30.0 |
| Resorcinol | | 2.5 | 2.5 |
| Tetramethylolhydrazone-dicarbonamide | | 2.0 | 2.0 |

The following bond strengths were found:

| Mixture | Bond strengths in kg. per 2.5 cm. | | |
|---|---|---|---|
| | 3a | 3b | 3c |
| Fabric: | | | |
| Cotton fabric | 2.7 | 7.0 | 12.9 |
| Rayon fabric | 1.5 | 4.8 | 17.5 |
| Nylon fabric | 1.1 | 9.5 | 24.7 |
| Polyester fabric | 1.0 | 2.0 | 8.0 |

Example 4

The following mixtures were prepared and tested in a manner analogous to Example 2:

| Mixture | Additives to basic mixture 1 in parts by weight | | | |
|---|---|---|---|---|
| | 4a | 4b | 4c | 4d |
| Nature of additives: | | | | |
| MT black | 35.0 | 35.0 | 10.0 | 10.0 |
| Silica filler 1 | | | 30.0 | 30.0 |
| Resorcinol | | 1.3 | 1.3 | 2.6 |
| 1-aza-3,7-dioxabicyclo[3,3,0]octane | | 1.0 | 1.0 | 2.0 |

The following bond strength values were found:

| Mixture | Bond strengths in kg. per 2.5 cm. | | | |
|---|---|---|---|---|
| | 4a | 4b | 4c | 4d |
| Fabric: | | | | |
| Rayon fabric | 1.5 | 2.2 | 6.5 | 7.3 |
| Nylon fabric | 1.1 | 3.4 | 7.4 | 11.3 |

Example 5

The following mixtures were prepared and tested in a manner analogous to Example 2:

| Mixture | Additives to basic mixture I in parts by weight | | | | |
|---|---|---|---|---|---|
| | 5a | 5b | 5c | 5d | 5e |
| Nature of additives: | | | | | |
| MT black | 35.0 | 35.0 | 10.0 | 35.0 | 10.0 |
| Silica filler 1 | | | 30.0 | | 30.0 |
| Resorcinol | | 2.5 | 2.5 | 2.5 | 2.5 |
| N-allyl-1,3,5-dioxazine | | 2.0 | 2.0 | | |
| N-phenyl-1,3,5-dioxazine | | | | 2.0 | 2.0 |

The results were as follows:

| Mixture | Bond strengths in kg. per 2.5 cm. | | | | |
|---|---|---|---|---|---|
| | 5a | 5b | 5c | 5d | 5e |
| Fabric: | | | | | |
| Nylon fabric | 1.1 | 6.5 | 12.1 | 9.7 | 11.5 |

Example 6

Bond strength tests were carried out with glass fabrics (225 warp threads TD 580 per 10 cm., 150 weft threads TD 580 per 10 cm., weight per square metre 280 g.) in a manner analogous to Example 2. Mixtures 1a, 1b, 1c, 1d and 2c were used. The following results were obtained:

| Mixture | Bond strengths in kg. per 2.5 cm. | | | | |
|---|---|---|---|---|---|
| | 1a | 1b | 1c | 1d | 2c |
| Glass fabric | 1.1 | 1.4 | 1.3 | 6.0 | 9.5 |

Example 7

In a manner analogous to Example 1, tests were carried out with the following mixtures based on butadiene-acrylonitrile rubber:

| Mixture | Components of mixture in parts by weight | | | | |
|---|---|---|---|---|---|
| | 7a | 7b | 7c | 7d | 7e |
| Nature of components: | | | | | |
| Butadiene-acrylonitrile rubber | 100.0 | 100.0 | 100.0 | 100.0 | 100.0 |
| SRF black | 30.0 | 30.0 | 25.0 | 25.0 | 25.0 |
| FEF black | 20.0 | 20.0 | | | |
| Silica filler 1 | | | 30.0 | 30.0 | 30.0 |
| Resorcinol | | 2.5 | | 2.5 | 2.5 |
| Zinc oxide | 5.0 | 5.0 | 5.0 | 5.0 | 5.0 |
| Coumarone resin | 5.0 | 5.0 | 5.0 | 5.0 | 5.0 |
| Xylene-formaldehyde resin | 10.0 | 10.0 | 10.0 | 10.0 | 10.0 |
| Stearic acid | 2.5 | 2.5 | 0.5 | 0.5 | 2.5 |
| N-phenyl-N'-cyclohexyl-p-phenylene diamine | 0.8 | 0.8 | 0.8 | 0.8 | 0.8 |
| Phenyl-α-naphthylamine | 0.8 | 0.8 | 0.8 | 0.8 | 0.8 |
| Sulphur | 2.0 | 2.0 | 2.0 | 2.0 | 2.0 |
| N-diethyl-2-benzthiazyl-sulphenamide | 1.5 | 1.5 | 1.5 | 1.5 | 1.5 |
| Hexamethylolmelamine pentamethylether | | 2.5 | | 2.5 | 2.5 |

In the same way as in Example 1, preliminary mixtures of rubber, carbon black, silica fillers and resorcinol were first prepared at about 130° C. The remaining constituents were added after the mixture had cooled to about 100° C. (see Example 1).

The subsequent test procedure was again the same as in Example 1. The same non-impregnated fabrics were again used. The results were as follows:

| Mixture | Bond strengths in kg. per 2.5 cm. | | | | |
|---|---|---|---|---|---|
| | 7a | 7b | 7c | 7d | 7e |
| Fabric: | | | | | |
| Cotton fabric | 5.4 | 6.9 | 8.5 | 10.2 | 10.8 |
| Rayon fabric | 2.6 | 11.2 | 4.9 | 7.2 | 17.5 |
| Nylon fabric | 1.8 | 23.0 | 3.0 | 29.3 | 38.5 |
| Polyester fabric | 2.0 | 7.5 | 4.4 | 4.9 | 9.1 |

Example 8

This example is intended to show that the additives according to the invention also increases the bond strengths in textiles which have already been impregnated to improve the bond strength. The test was carried out on a polyester cord (TD 800/1 x 2) pretreated on the basis of a solution of a rubber mixture with isocyanate additive and on nylon cord (TD 1680/1 x 2) pretreated on the basis of latex and resorcinol formaldehyde resin.

The rubber mixture 8a used for pretreating the polyester cord had the following composition:

Mixture 8b

| | Parts by weight |
|---|---|
| Natural rubber | 100.0 |
| Zinc oxide | 20.0 |
| HAF black | 40.0 |
| Coumarone resin | 4.0 |
| Aromatic mineral oil | 3.0 |

After this mixture 8a had been dissolved in benzene in the ratio of 1:5 then 5 parts by weight of tripentylmethane triisocyanate, based on the dry rubber mixture, were added. The polyester cord was impregnated with this solution.

The nylon cord was treated with an impregnating mixture of the following composition:

| | Parts by weight |
|---|---|
| Latex of a copolymer of butadiene, styrene and vinyl pyridine, 40% | 250.0 |
| Precondensed resorcinol formaldehyde resin | 20.0 |
| Formaldehyde solution, 30% | 20.0 |
| Water | 340.0 |
| | 630.0 |

Total dry content 20%

These nylon cords were heated for about 10 minutes at 135° C. in the course of the drying process.

Mixtures 1a, 1b, 1c, and 1d were used for incorporation by vulcanisation into the pretreated polyester and nylon cord.

The cords were embedded in each case between two strips 40 cm. in length, 3 mm. in thickness and 2 cm. in width prepared from these mixtures, the cords being embedded perpendicularly to the direction of the strips and at intervals of 1.5 cm. Vulcanisation of the test samples containing the cords was carried out for 50 minutes at 138° C.

To determine the static bond strength, individual test samples 1.5 cm. in length were punched out of the test strips in such a way that each sample contained one cord (embedded to a length of 2 cm.) in the middle. After preheating to 80° C., the force required for pulling the cord out of the rubber was measured in a chamber heated to 80° C.

The test method is fully described in "Bayer-Mitteilungen für die Gummi-Industrie" No. 29, pages 71 to 78.

The following bond strengths were obtained:

| Mixtures | Static bond strengths (kg.) at 80° C. | |
|---|---|---|
| | Pretreated polyester cord | Pretreated nylon cord |
| Mixture 1a | 6.3 | 14.4 |
| Mixture 1b | 8.8 | 18.2 |
| Mixture 1c | 10.2 | 19.4 |
| Mixture 1d | 12.6 | (¹) |

¹ All cords broken above 20 kg.

Example 9

Mixtures 1a, 1b and 1d were dissolved in benzene in the ratio of 1:4.5 and then applied in a thickness of about 0.5 mm. to the rayon fabric described in Example 1 by several applications by means of a spread coating machine. After drying, the sections of fabric were folded double and then vulcanised partly in a press under a compression pressure of 20 kg./cm.², partly in superheated steam at 2.5 atmospheres above atmospheric pressure and partly in hot air at 138° C. (=2.5 atmospheres above atmospheric pressure) with an additional air pressure of 3 atmospheres above atmospheric pressure.

Strips 2.5 cm. in width were punched out of the vulcanised sheets and then investigated by tests analogous to those in Example 1. The results were as follows:

| Vulcanization | Bond strengths of coated rayon fabrics in kg. per 2.5 cm. | | |
|---|---|---|---|
| | In the press 50' at 2.5 ats. above atmospheric pressure | In superheated steam at 2.5 ats. above atmospheric pressure 50' | In hot air at 138° C. plus 3 ats. air pressure above atmospheric pressure |
| Coating solutions: | | | |
| Solution of mixture 1a | 2.3 | 1.8 | 3.5 |
| Solution of mixture 1b | 3.4 | 2.5 | 6.5 |
| Solution of mixture 1d | 10.0 | 7.1 | 10.4 |

Example 10

The effect of the additives according to the invention in tyre mixtures of pure natural rubber on the bond strength of non-impregnated and impregnated rayon cord is investigated. The rubber mixtures used had the following composition:

| Mixture | Parts by weight | | | |
|---|---|---|---|---|
| | 10a | 10b | 10c | 10d |
| Natural rubber | 100.0 | 100.0 | 100.0 | 100.0 |
| Zinc oxide | 2.0 | 2.0 | 2.0 | 2.0 |
| SRF black | 25.0 | 25.0 | | |
| Silica filler 1 | | | 25.0 | 25.0 |
| Resorcinol | | 2.5 | | 2.5 |

| Mixture | Parts by weight | | | |
|---|---|---|---|---|
| | 10a | 10b | 10c | 10d |
| Stearic acid | 0.5 | 0.5 | | |
| Pine tar | 3.0 | 3.0 | 3.0 | 3.0 |
| Phenyl-α-naphthylamine | 1.5 | 1.5 | 1.5 | 1.5 |
| Sulphur | 2.3 | 2.3 | 2.0 | 2.0 |
| Benzthiazyl-2-cyclohexyl-sulphenamide | 0.5 | 0.8 | 1.0 | 1.0 |
| Diethyl-dithio carbamic acid zinc | | | 0.4 | 0.4 |
| Hexamethylolmelamine pentamethyl ether | | 2.5 | | 2.5 |

Into these mixtures were introduced completely untreated rayon cord (TD 1650/1 x 2) and the same rayon cord pretreated with the following impregnating mixture:

| | Parts by weight |
|---|---|
| Natural rubber latex, 60% | 125.0 |
| Latex of a copolymer of butadiene, styrene and vinyl pyridine, 40% | 62.5 |
| Precondensed resorcinol formaldehyde resin | 20.0 |
| Formaldehyde solution, 30% | 20.0 |
| Water | 1872.5 |
| | 2100.0 |

Total dry content 6%.

The filaments were incorporated and vulcanised by the process described in Example 8. The static bond strength was determined by a method analogous to that described in Example 8.

The dynamic bond strength, on the other hand, was determined by clamping the test strip described above into the movable part of a test machine and heating it to 80° C. The projecting ends of the cord filaments were fixed to the stationary part of the machine. The rubber was then moved to and fro 500 times per minute with a total stroke of 2.5 mm. (±1.25 mm.) The time required for the cord filament to become detached from the rubber under this stress was determined (in minutes).

The dynamic test method employed is recorded on pages 78 to 81 of "Bayer-Mitteilungen für die Gummi-Industrie," No. 29.

The test results obtained are shown in the following table:

| | Static and dynamic bond strength at 80° C. | | | | | | | |
|---|---|---|---|---|---|---|---|---|
| | Mixture 10a | | Mixture 10b | | Mixture 10c | | Mixture 10d | |
| Tyre cord | Stat. (kg.) | Dyn. (min.) | Stat. (kg.) | Dyn. (min.) | Stat. (kg.) | Dyn. (min.) | Stat. (kg.) | Dyn. (min.) |
| Untreated Rayon cord | 2.4 | 19 | 6.3 | 55 | 3.3 | 19 | 12.0 | 216 |
| Rayon cord impregnated with latex plus resorcinol formaldehyde resin | 7.5 | 184 | 9.8 | 115 | 10.0 | 211 | 12.6 | 259 |

Example 11

The influence of the additive according to the invention on the bond strength between a conveyor belt fabric and the friction/cushion compound based on styrene-butadiene rubber was tested. The following mixtures were used:

| Mixture | Parts by weight | | | |
|---|---|---|---|---|
| | 11a | 11b | 11c | 11d |
| Styrene butadiene rubber | 100.0 | 100.0 | 100.0 | 100.0 |
| HAF black | 20.0 | 20.0 | | |
| SAF black | 15.0 | 15.0 | | |
| Silica filler 1 | | | 25.0 | 25.0 |
| Resorcinol | | 2.5 | | 2.5 |
| Aromatic mineral oil | 8.0 | 8.0 | 8.0 | 8.0 |
| Stearic acid | 1.5 | 1.5 | 1.5 | 1.5 |
| Phenyl-α-naphthylamine | 1.5 | 1.5 | 1.5 | 1.5 |
| Zinc oxide | 5.0 | 5.0 | 5.0 | 5.0 |
| Benzthiazyl-2-cyclohexyl sulphenamide | 1.25 | 1.4 | 1.6 | 1.6 |
| Thiuramic monosulphide | 0.15 | 0.15 | 0.15 | 0.25 |
| Sulphur | 1.8 | 1.8 | 1.8 | 1.8 |
| Hexamethylol melamine pentamethyl ether | | 2.5 | | 2.5 |

The tests were carried out in a manner analogous to Example 2, but a conveyor belt fabric of the following structure was employed, 126 warp threads of polyester yarn TD 1000/3 per 10 cm., 46 weft threads of nylon yarn TD 840/3 per 10 cm., weight per square metre 600 g.

The following values for bond strength were obtained:

| | Bond strength in kg. per 2.5 cm. | | | |
|---|---|---|---|---|
| Mixture | 11a | 11b | 11c | 11d |
| Polyester conveyor band fabric not-impregnated | 1.4 | 2.6 | 3.0 | 12.0 |

Example 12

Tests were carried out with para-formaldehyde in a manner analogous to Example 2. Mixtures 12a to 12d were used which differed from those in Example 2 in containing the following additives in addition to the constituents of the basic mixture I:

| | Additives to basic mixture I in parts by weight | | | |
|---|---|---|---|---|
| Mixture | 12a | 12b | 12c | 12d |
| Nature of additives not-impregnated: | | | | |
| MT black | 35.0 | 35.0 | 10.0 | 10.0 |
| Silica filler 1 | | | 30.0 | 30.0 |
| Resorcinol | | 1.25 | | 1.25 |
| Para-formaldehyde | | 1.0 | | 1.0 |

The following bond strength were recorded:

| | Bond strength in kg. per 2.5 cm. | | | |
|---|---|---|---|---|
| Mixture | 12a | 12b | 12c | 12d |
| Fabric: | | | | |
| Rayon fabric | 0.5 | 1.3 | 1.7 | 3.4 |
| Nylon fabric | 0.5 | 2.0 | 1.3 | 4.3 |

Example 13

The same tests were carried out as in Example 1 but first a solution of resorcinol in hexamethylolmelamine pentamethyl ether in the ratio of 1:1 was prepared by 48 hours' storage at 50° C. The process of preparing the rubber mixture could now be carried out much more simply because it was now no longer necessary to prepare a preliminary mixture of rubber, filler and resorcinol.

The mixtures were prepared in an internal mixer at 150° C. without resorcinol and without formaldehyde splitter and without any special precautions. After cooling to about 90° C., 5 parts by weight of the above solution were added together with sulphur and vulcanisation accelerators.

Tests analogous to those in Example 1 carried out on the mixtures gave practically the same bond strengths as in Example 1.

In a further experiment, a solution of resorcinol in hexamethylolmelamine pentamethylether was subsequently added at 120° C. instead of at mixing temperature of 90° C. Here again the same bond strengths were obtained as previously whereas there was a distinct drop in bond strengths when a preliminary mixture of rubber and resorcinol was used in accordance with Example 1 and melamine ether was subsequently added at 120° C.

The process comprising the use of the resorcinol solution is thus not only easier to handle but also less sensitive to changes in temperature.

Example 14

In a manner analogous to Example 13 also in order to avoid preparing a preliminary mixture with resorcinol on the mill 2.5 parts by weight of resorcinol were first dissolved in 4.2 parts by weight of xylene-formaldehyde resin with heating. This solution was added as in Example 13 at the end of the process of mixing the rubber mixture.

The results of bond strength tests were the same as in Example 13 and thus showed that resorcinol solutions in plasticisers may also be added to advantage.

Example 15

Tests were carried out which corresponded to those in Example 1 but in which 2.5 parts by weight of resorcinol were replaced by (a) 2.5 parts by weight of m-aminophenol and (b) 4.4 parts by weight of resorcinol diacetate.

Tests yielded practically the same results as in Example 1 except that for untreated rayon, the values for (b) were 20% higher.

Example 16

Mixtures 15a to 15i were prepared and tested in the manner analogous to Example 2.

| | Varied mixture components in parts by weight | | | | | |
|---|---|---|---|---|---|---|
| Mixture | 18a | 18b | 18c | 18d | 18e | 18f |
| Nature of components: | | | | | | |
| FEF black | 20.0 | 20.0 | 20.0 | | | |
| Silica filler I | | | | 30.0 | 30.0 | 30.0 |
| Stearic acid | 2.5 | 2.5 | 2.5 | 2.5 | 2.5 | 2.5 |
| Resorcinol | 1.25 | 1.25 | | 1.25 | 1.25 | |
| Tetramethylolmelamine | | 1.0 | | | 1.0 | |
| Pentamethylolmelamine | | | 1.0 | | | 1.0 |

Rayon cord (TD 1650/1 x 2), nylon cord (TD 1680/1 x 2) and polyester cord (TD 1000/1 x 3, e.g. "Diolen type 162" of Vereinigten Glanzstoff-Fabriken/Wuppertal or "Trevira GPA" of Farbwerke Hoechst), none of which filaments had undergone any pretreatment, were then incorporated by vulcanisation and tested as described in Example 8. The following results are obtained:

| | Static bond strength (kg.) at 80° C. | | | | | |
|---|---|---|---|---|---|---|
| Mixture | 18a | 18b | 18c | 18d | 18e | 18f |
| Rayon cord, untreated | 2.8 | 5.4 | 5.6 | 4.3 | 8.3 | 9.8 |
| Nylon cord, untreated | 3.2 | 6.1 | 6.4 | 5.5 | 16.9 | [1] 20.0 |
| Polyester cord, untreated | 3.3 | 5.8 | 5.2 | 5.3 | 11.7 | 12.4 |

[1] Thread rupture.

| | Additions to basic mixture I in parts by weight | | | | | | | | |
|---|---|---|---|---|---|---|---|---|---|
| Mixture | 15a | 15b | 15c | 15d | 15e | 15f | 15g | 15h | 15i |
| Type of additives: | | | | | | | | | |
| MT black | 35.0 | 35.0 | 10.0 | 35.0 | 10.0 | 35.0 | 10.0 | 35.0 | 10.0 |
| Silica filler I | | | 30.0 | | 30.0 | | 30.0 | | 30.0 |
| Resorcinol | | 2.5 | 2.5 | 2.5 | 2.5 | 2.5 | 2.5 | 2.5 | 2.5 |
| Tetramethylol acetylene diurea | | 2.0 | 2.0 | | | | | | |
| Hexamethylene tetramine | | | | 2.0 | 2.0 | | | | |
| Methyleneaminoacetonitrile | | | | | | 2.0 | 2.0 | | |
| N,N'-dimethylolurea | | | | | | | | 2.5 | 2.5 |

The results were as follows:

| Mixture | 15a | 15b | 15c | 15d | 15e | 15f | 15g | 15h | 15i |
|---|---|---|---|---|---|---|---|---|---|
| Rayon fabric | 1.5 | 3.5 | 11.5 | 2.4 | 9.5 | 4.9 | 13.3 | 2.7 | 9.9 |
| Nylon fabric | 1.1 | 5.4 | 17.5 | 1.9 | 7.3 | 3.2 | 9.4 | 2.7 | 6.9 |

Example 17

The following mixtures 16a and 16d were prepared by a method similar to that in Example 2:

| | Additions to basic mixture I in parts by weight | | | |
|---|---|---|---|---|
| Mixture | 16a | 16b | 16c | 16d |
| Type of additives: | | | | |
| MT black | 35.0 | 35.0 | 10.0 | 10.0 |
| Silica filler I | | | 30.0 | 30.0 |
| Resorcinol | | 2.5 | | 2.5 |
| Hexamethylolmelaminepentamethyl ether | | 2.5 | | 2.5 |

Thick polyamide wires (diameter 2.1 mm.) on the one hand and steel cord, both raw and coated with brass (structure: 7 x 3 x 0.15 mm.) on the other hand were incorporated and vulcanised into these mixtures in the same way as the polyester and nylon cord filaments of Example 8 and tested at 80° C.

| | Bond strength at 80° C. | | | |
|---|---|---|---|---|
| Mixture | 16a | 16b | 16c | 16d |
| Thick polyamide wires | 2.1 | 2.6 | 2.2 | 19.2 |
| Raw steel cord | 2.6 | 3.6 | 4.8 | 6.7 |
| Steel cord coated with brass | 7.9 | 11.1 | 15.5 | 19.7 |

Example 18

Mixtures based on butadiene-acrylonitrile rubber of the type described in Example 7 were used. All the components not mentioned in the following table were the same as in Example 7. Only the following substances were altered:

Example 19

The following mixtures were prepared on a mixing mill:

| | Constituents of mixture in parts by weight | | | |
|---|---|---|---|---|
| Mixture | 19a | 19b | 19c | 19d |
| Nature of constituents: | | | | |
| Chlorobutadiene rubber | 100.0 | 100.0 | 100.0 | 100.0 |
| HAF black | 25.0 | 25.0 | | |
| Silica filler I | | | 30.0 | 30.0 |
| Magnesium oxide | 4.0 | 4.0 | 4.0 | 4.0 |
| Zinc oxide | 5.0 | 5.0 | 5.0 | 5.0 |
| Stearic acid | 1.5 | 1.5 | 1.5 | 1.5 |
| Dibutylester of methylene-bis-thioglycollic acid | 5.0 | 5.0 | 5.0 | 5.0 |
| Xylene-formaldehyde resin | 4.0 | 4.0 | 4.0 | 4.0 |
| Phenyl-α-naphthylamine | 2.0 | 2.0 | 2.0 | 2.0 |
| Sulphur | 0.5 | 0.5 | 0.5 | 0.5 |
| Di-o-tolylguanidine | 1.0 | 1.0 | 1.0 | 1.0 |
| Tetramethyl-thiuramic monosulphide | 1.0 | 1.0 | 1.0 | 1.0 |
| Resorcinol | | 2.5 | | 2.5 |
| Hexamethylolmelamine pentamethylether | | 2.5 | | 2.5 |

When the rubber mixture had cooled to about 90° C., resorcinol and hexamethylolmelamine pentamethyl ether were added in a manner analogous to Example 13 in the form of a solution of resorcinol in the formaldehyde splitter together with sulphur and vulcanisation accelerators.

Cord filaments of the same type as in Example 18 which had not undergone preliminary treatment were incorporated into these mixtures by vulcanisation and tested as described in the said example.

The following results were obtained:

| Mixture | Static bond strength (kg.) at 80° C. | | | |
|---|---|---|---|---|
| | 19a | 19b | 19c | 19d |
| Rayon cord, untreated | 3.2 | 7.3 | 1.4 | 12.2 |
| Nylon cord, untreated | 2.8 | 7.5 | 1.2 | 18.7 |
| Polyester cord, untreated | 3.1 | 8.1 | 1.5 | 13.1 |

Example 20

The following mixtures were prepared on a mixing mill:

| Mixture | Constituents of mixture in parts by weight | | | |
|---|---|---|---|---|
| | 20a | 20b | 20c | 20d |
| Nature of constituents: | | | | |
| Isobutylene-isoprene rubber | 100.0 | 100.0 | 100.0 | 100.0 |
| FEF black | 50.0 | 50.0 | 20.0 | 20.0 |
| Silica filler 1 | | | 30.0 | 30.0 |
| Naphthenic mineral oil | 25.0 | 25.0 | 25.0 | 25.0 |
| Stearic acid | 2.0 | 2.0 | 2.0 | 2.0 |
| Red lead | 5.0 | 5.0 | 5.0 | 5.0 |
| Zinc oxide | 10.0 | 10.0 | 10.0 | 10.0 |
| Mixture of 2 parts of tetramethylthiuramic disulphide and 1 part of 2-mercaptobenzthiazole | 1.0 | 1.0 | 1.0 | 1.0 |
| Diethyldithiocarbamic acid zinc | 1.0 | 1.0 | 1.0 | 1.0 |
| Sulphur | 1.5 | 1.5 | 1.5 | 1.5 |
| Dicyclohexylamine | | | 3.0 | 3.0 |
| Resorcinol | | 2.5 | | 2.5 |
| Hexamethylolmelaminepentamethylether | | 2.5 | | 2.5 |

Resorcinol and formaldehyde splitters were subsequently added in the form of a solution as in Examples 13 and 19.

The same types of cord filaments were again incorporated by vulcanisation and tested as in Example 18.

The results were as follows:

| Mixture | Static bond strength (kg.) at 80° C. | | | |
|---|---|---|---|---|
| | 20a | 20b | 20c | 20d |
| Rayon cord, untreated | 2.3 | 3.4 | 2.6 | 5.9 |
| Nylon cord, untreated | 2.1 | 2.8 | 2.1 | 4.4 |
| Polyester cord, untreated | 2.7 | 3.4 | 3.9 | 7.0 |

Example 21

The following mixtures were prepared on a mixing mill:

| Mixture | Constituents of mixture in parts by weight | | | |
|---|---|---|---|---|
| | 21a | 21b | 21c | 21d |
| Nature of constituents: | | | | |
| Ethylene-propylene-dicyclopentadiene rubber | 100.0 | 100.0 | 100.0 | 100.0 |
| ISAF black | 20.0 | 20.0 | | |
| FEF black | 30.0 | 30.0 | 20.0 | 20.0 |
| Silica filler 1 | | | 30.0 | 30.0 |
| Zinc oxide | 5.0 | 5.0 | 5.0 | 5.0 |
| Paraffinic mineral oil | 10.0 | 10.0 | 10.0 | 10.0 |
| Disproportionated colophony | 7.5 | 7.5 | 7.5 | 7.5 |
| Stearic acid | 1.0 | 1.0 | 1.0 | 1.0 |
| Sulphur | 1.5 | 1.5 | 1.5 | 1.5 |
| Tetramethylthiuramic disulphide | 1.5 | 1.5 | 1.5 | 1.5 |
| 2-mercapto-benzthiazole | 0.5 | 0.5 | 0.5 | 0.5 |
| Dicyclohexylamine | | | 3.0 | 3.0 |
| Resorcinol | | 4.0 | | 4.0 |
| Hexamethylolmelamine pentamethylether | | 4.0 | | 4.0 |

Resorcinol was dissolved in hexamethylolmelamine pentamethyl ether as in Example 13 and then incorporated into the rubber mixture at the end of the mixing process after cooling to about 90° C.

As in Example 18 to 20, untreated tyre cord of the types indicated therein was incorporated again by vulcanisation and tested as described in Example 8.

The results of bond strength tests were as follows:

| Mixture | Static bond strength (kg.) at 80° C. | | | |
|---|---|---|---|---|
| | 21a | 21b | 21c | 21d |
| Rayon cord, untreated | 3.1 | 4.6 | 3.7 | 7.6 |
| Nylon cord, untreated | 2.7 | 3.8 | 3.3 | 6.8 |
| Polyester cord, untreated | 3.2 | 4.7 | 5.1 | 9.0 |

Example 22

To investigate the bond strength obtainable in the event of the components according to the invention being partly applied to the fabric and only the remaining components being contained in the rubber mixture, the following mixtures were prepared on mixing mills:

| Mixture | Constituents of mixture in parts by weight | | | | |
|---|---|---|---|---|---|
| | 22a | 22b | 22c | 22d | 22e |
| Nature of constituents: | | | | | |
| Natural rubber | 100.0 | 100.0 | 100.0 | 100.0 | 100.0 |
| ISAF black | 45.0 | 25.0 | 25.0 | 25.0 | 25.0 |
| Silica filler 1 | | 25.0 | 25.0 | 25.0 | 25.0 |
| Zinc oxide | 3.0 | 3.0 | 3.0 | 3.0 | 3.0 |
| Stearic acid | 3.0 | 3.0 | 3.0 | 3.0 | 3.0 |
| Paraffin | 0.6 | 0.6 | 0.6 | 0.6 | 0.6 |
| Diphenylnitrosamine | 0.8 | 0.8 | 0.8 | 0.8 | 0.8 |
| Aromatic mineral oil | 4.5 | 4.5 | 4.5 | 4.5 | 4.5 |
| N-phenyl-N'-cyclohexyl-p-phenylenediamine | 1.0 | 1.0 | 1.0 | 1.0 | 1.0 |
| Phenyl-α-naphthylamine | 1.5 | 1.5 | 1.5 | 1.5 | 1.5 |
| Di-cyclohexylamine | | 1.5 | 1.5 | 1.5 | 1.5 |
| Sulphur | 2.5 | 2.5 | 2.5 | 2.5 | 2.5 |
| Benzthiazyl-2-cyclohexylsulphenamide | 0.45 | 0.45 | 0.45 | 0.45 | 0.45 |
| Resorcinol | | 2.5 | 2.5 | | |
| Hexamethylolmelamine pentamethylether | | 2.5 | | 2.5 | |

Rayon cord filaments (TD 1650/1 x 2) and nylon cord filaments (TD 1680/1 x 2) were incorporated by vulcanisation into these mixtures by the process described in Example 8. The cord filaments were employed in the following forms:

(a) untreated
(b) impregnated with a 20% solution of hexamethylolmelamine pentamethyl ether in water,
(c) impregnated with a 10% solution of resorcinol in ethyl acetate
(d) impregnated with an aqueous emulsion of resorcinol (about 10% dry content) which had been prepared by the following method: 25 parts by weight of resorcinol were dissolved in 70 parts by weight of ethyl acetate. 30 parts by weight of toluene were then added. This solution was mixed with 130 parts by weight of a 3% solution of a non-ionogenic emulsifier in water, whereupon the whole mixture was emulsified in an apparatus with high speed stirrer.

The impregnated cord filaments were in all cases dried before they were incorporated.

The tests carried out according to the procedure indicated in Example 8 yielded the following results:

| Mixture | Bond strength (kg.) at 80° C. | | | | |
|---|---|---|---|---|---|
| | 22a | 22b | 22c | 22d | 22e |
| Rayon cord: | | | | | |
| (a) Untreated | 1.7 | 1.8 | 13.9 | 2.6 | 3.0 |
| (b) Impregnated with hexamethylolmelamine pentamethyl ether in water | 2.5 | 2.8 | | 15.5 | |
| (c) Impregnated with resorcinol in ethyl acetate | 2.8 | 3.1 | | | 21.0 |
| (d) Impregnated with resorcinol in aqueous emulsion | 2.6 | 2.8 | | | 12.5 |
| Nylon cord: | | | | | |
| (a) Untreated | 1.1 | 1.0 | 9.4 | 1.4 | 1.7 |
| (b) Impregnated with hexamethylolmelamine pentamethylether in water | 3.4 | 4.2 | | 9.8 | |
| (c) Impregnated with resorcinol in ethyl acetate | 3.6 | 4.4 | | | 23.0 |
| (d) Impregnated with resorcinol in aqueous emulsion | 3.5 | 4.3 | | | 15.5 |

The figures show clearly that the bond strengths of cord filaments is considerably improved as soon as the three principle components according to the invention come together in the zone of contact between the filaments and the rubber mixture.

What we claim is:

1. In the process of bonding a non-preimpregnated textile material or a metal directly to a rubber composition, the improvement which comprises incorporating in said rubber composition vulcanizing ingredients, a formaldehyde donor in an amount of 0.2 to 10% by weight based on the weight of the rubber in said composition, a member selected from the group consisting of resorcinol, m-aminophenol, m-phenylenediamine, resorcinol diacetate, resorcinol propionate, resorcinol butyrate, resorcinol monomethylether, resorcinol propylether and 1,5-dihydroxynaphthalene and finely dispersed silica filler in an amount of at least 15% by weight based on the weight of the rubber in said composition and having a surface area of 70–400 m.$^2$/g., bringing the non-preimpregnated textile material or metal in direct physical contact with resulting rubber composition and vulcanizing said resulting rubber composition.

2. The process of claim 1 wherein said rubber composition contains 15 to 70% by weight of said silica filler based on the weight of the rubber in said composition.

3. The process of claim 2 wherein said rubber composition contains from 20 to 60% by weight of said silica filler.

4. The process of claim 1 wherein the surface area of said silica is 80–200 m.$^2$/g.

5. The process of claim 1 wherein the ratio by weight of said member selected from said group and said formaldehyde donor is between 0.2:1 and 2:1.

6. The process of claim 1 wherein said formaldehyde donor is selected from the group consisting of hexamethylolmelamine pentamethylether, hexamethylolmelamine, tetramethylolhydrazone dicarbonamide, N - allyl - 1,3,5-dioxamine and N-phenyl-1,3,5-dioxazine.

7. The process of claim 1 wherein said rubber composition contains up to 5% by weight of stearic acid based on the weight of rubber in said composition.

8. A material bonded directly to a vulcanized rubber composition, said material comprising a non-preimpregnated textile material or metal and said rubber composition containing, prior to vulcanization, vulcanizing ingredients, a formaldehyde donor in an amount of 0.2 to 10% by weight based on the weight of the rubber in said composition, a member selected from the group consisting of resorcinol, m-aminophenol, m-phenylenediamine, resorcinol diacetate, resorcinol propionate, resorcinol butyrate, resorcinol monomethylether, resorcinol propylether and 1,5-dihydroxynaphthalene and finely dispersed silica filler in an amount of at least 15% by weight based on the weight of the rubber in said composition and having a surface area of 70–400 m.$^2$/g.

9. The bonded material of claim 8 wherein said rubber composition contains 15 to 70% by weight of said silica filler based on the weight of the rubber in said composition.

10. The bonded material of claim 9 wherein the rubber in said composition contains from 20 to 60% by weight of said silica filler.

11. The bonded material of claim 8 wherein the surface area of said silica is 80–200 m.$^2$/g.

12. The bonded material of claim 8 wherein the ratio by weight of said member selected from said group and said formaldehyde donor is between 0.2:1 and 2:1.

13. The bonded material of claim 8 wherein said formaldehyde donor is selected from the group consisting of hexamethylolmelamine pentamethylether, hexamethylolmelamine, tetramethyolhydrazone dicarbonamide, N-allyl-1,3,5-dioxamine and N-phenyl-1,3,5-dioxazine.

References Cited

UNITED STATES PATENTS

| | | | |
|---|---|---|---|
| 2,955,102 | 10/1960 | Clayton et al. | 260—79.5 |
| 3,366,583 | 1/1968 | Wilson | 260—3 |
| 3,411,970 | 11/1968 | Perrin | 161—227 X |
| 3,018,207 | 1/1962 | Danielson | 161—110 M D |
| 2,746,898 | 10/1953 | Buckwalter et al. | 161—241 |

FOREIGN PATENTS 1,078,320　3/1960　Germany.

ALFRED L. LEAVITT, Primary Examiner

C. B. COSBY, Assistant Examiner

U.S. Cl. X.R.

156—308, 338; 161—89, 162, 165, 215, 217, 221, 240, 247, 257; 260—37, 38, 41.5, 746